US012700706B2

(12) United States Patent
Keller et al.

(10) Patent No.: US 12,700,706 B2
(45) Date of Patent: Aug. 4, 2026

(54) CRIMPING ASSEMBLY, TOOL AND DIE DESIGN

(71) Applicant: Ilsco, LLC, Cincinnati, OH (US)

(72) Inventors: Patrick J. Keller, Burlington, KY (US); Stephen K. Mayo, West Chester, OH (US); Kelly E. Schutte, Cincinnati, OH (US); Zachary W. Strong, Cincinnati, OH (US)

(73) Assignee: Ilsco, LLC, Cincinnati, OH (US)

(*) Notice: Subject to any disclaimer, the term of this patent is extended or adjusted under 35 U.S.C. 154(b) by 10 days.

(21) Appl. No.: 18/773,757

(22) Filed: Jul. 16, 2024

(65) Prior Publication Data

US 2024/0372307 A1 Nov. 7, 2024

Related U.S. Application Data

(63) Continuation of application No. 17/344,198, filed on Jun. 10, 2021, now Pat. No. 12,040,581.

(60) Provisional application No. 63/044,415, filed on Jun. 26, 2020.

(51) Int. Cl.
*H01R 43/04* (2006.01)
*H01R 43/042* (2006.01)

(52) U.S. Cl.
CPC .................................. *H01R 43/042* (2013.01)

(58) Field of Classification Search
CPC H01R 43/042; H01R 43/0585; H01R 43/058; H01R 43/0425; H01R 43/0427
See application file for complete search history.

(56) References Cited

U.S. PATENT DOCUMENTS

| | | | |
|---|---|---|---|
| 3,146,519 A | 9/1964 | Redwine | |
| 3,332,272 A | 7/1967 | Tonchen | |
| 5,152,162 A | 10/1992 | Ferraro et al. | |
| 5,193,379 A | 3/1993 | Ferraro | |
| 6,101,862 A | 8/2000 | Rzasa et al. | |
| 6,276,186 B1 | 8/2001 | Frenken | |
| 6,718,870 B1 | 4/2004 | Frenken | |
| 8,997,543 B2 | 4/2015 | Therrien | |
| 9,543,727 B2 | 1/2017 | Taylor | |
| 10,109,971 B2 | 10/2018 | Lefavour et al. | |
| 2017/0201056 A1 | 7/2017 | Malloy et al. | |
| 2017/0302044 A1 | 10/2017 | Lefavour et al. | |
| 2019/0006810 A1* | 1/2019 | Robicheau | B21J 9/06 |

* cited by examiner

*Primary Examiner* — Debra M Sullivan
(74) *Attorney, Agent, or Firm* — Quarles & Brady LLP

(57) ABSTRACT

A die set can be provided for use in a crimping tool to crimp a connector onto a conductor. A first die of the die set can include a mating surface and a working surface. The mating surface can selectively mate with the crimping tool. The working surface can include an indenting member that projects away from the mating surface to form an indentation in the connector when the connector is crimped to the conductor by the crimping tool. The indenting member can include a plurality of non-planar faces, each of the plurality of non-planar faces including a concave portion.

20 Claims, 16 Drawing Sheets

CRIMPING ASSEMBLY, TOOL AND DIE DESIGN

This application claims priority to and incorporates by reference in their entirety U.S. Provisional Patent Application Ser. No. 63/044,415, filed Jun. 26, 2020, and U.S. patent application Ser. No. 17/344,198, filed Jun. 10, 2021.

BACKGROUND OF THE INVENTION

This invention relates generally to a crimping assembly. More particularly, this invention relates to a crimp tool and die set useful for a wide variety of crimping applications and methods of using the same.

Many portable power tools are handheld tools that have electric motors to drive a working head used to perform various tasks, such as crimping, drilling, shaping, fastening, grinding, polishing, heating, etc. Some portable tools incorporate a hydraulic pump to enable the working head to apply a relatively large amount of force or pressure for a particular task. Such tools may operate with a hydraulic pump actuated by a battery powered electric motor. Battery powered hydraulic power tools are employed in numerous applications to provide an operator with a desired flexibility and mechanical advantage.

One common use of such tools is for making crimping connections, such as crimping large power connectors or lugs onto large conductors. This application may require added force to crimp such large conductors, e.g., #8 conductors and larger, to suitable connectors. Such battery powered hydraulic power tools often come with dies to perform the crimping operation.

Hand-operated or motor-driven hydraulic tools are often employed for such joining procedures. These tools may be provided with an excess pressure valve which limits the oil pressure, and thus the compressive force of the moving part against the workpiece to be pressed, to a maximum value. It is important to ensure a well-made joint between an electrical connector, such as a cable eye, and an electrical conductor. A prescribed minimum compressive force is desired to achieve such a connection. After release of the crimping tool, or rather the moving part thereof, it is returned to the initial position, i.e. the open position of the crimping tool.

Crimping tools using interchangeable accessory dies are known in the art. As will be appreciated by one of ordinary skill in the art, crimp die sets are used in various fields for various purposes. One particularly applicable field involves the crimping of connectors onto multi-service conductors as described above.

For these types of environments, particularized crimp die sets and methods have been developed. For example, when installing electrical connectors to conductor ground wires, it is particularly imperative that the materials stay connected even under stress or otherwise the connection is lost. To this end, Underwriter's Laboratories (UL) has promulgated standards for electrical connectors that specify a minimum "pull off" value. As will be appreciated, the pull off value is the amount of stress (pounds) that is required to pull the connector off of the conductor. By requiring a minimum pull off value, UL-approved products can help assure that wires and the like stay attached to the metal connectors through the range of stresses that may be encountered in the applicable environment, thereby maintaining the protection against ground faults and loss of electrical connection.

Originally, die taking tools such as crimping tools were created to allow the connector or lug to be matched with the exact die necessary to crimp the particular lug.

However, some existing crimping tools such as 12-ton crimping tools cannot crimp a 1000 kcmil lug due to physical constraints which do not allow the 1000 kcmil lugs to fit between the jaws of a 12-ton tool when the dies are in place. One tool solution requires a separate tool to be purchased and utilized for the needed space between the dies installed in the tool. This option requires a high inventory of dies and tools which is expensive and inefficient in the field.

One option would be to procure a separate 15 T tool with sufficient opening between the jaws, and then purchase adapters to fit the u-dies or procure a single point indenter tool capable of crimping a 1000 kcmil Lug. The inventory of crimping tools and necessary dies makes such a solution impractical.

SUMMARY OF THE INVENTION

These and other shortcomings in the prior art have been addressed by embodiments of this invention which may include a crimping assembly, crimping tool, die sets and associated methods.

In one embodiment, this invention is a die set with a single point indenter profile for fitment into a 12 T U-die taking tool, allowing crimping of a 1000 kcmil lug with the current tool format. This avoids the need to purchase a separate crimping tool. As is known by one of ordinary skill in the art, kcmil or circular mil is a unit of area, equal to the area of a circle with a diameter of one mil (one thousandth of an inch). It is a unit intended for referring to the area of a wire with a circular cross section. As the area in circular mils can be calculated without reference ton, the unit makes conversion between cross section and diameter of a wire considerably easier.

In Canada and the United States, the National Electrical Code (NEC) uses the circular mil to define wire sizes larger than 0000 AWG. In many NEC publications and uses, large wires may be expressed in thousands of circular mils, which may be abbreviated as Kcmil. For example, one common wire size used in the NEC has a cross-section of 250,000 circular mils, written as 250 kcmil, which is the first size larger than 0000 AWG used within the NEC.

In one embodiment, this invention includes a die set with an indenter feature in two configurations to encompass the required range of conductors in existing crimping tools, consisting of two pyramid indenter dies and one common wedge die.

One advantage of one embodiment of this invention is it allows the strength and versatility of a die set with a single-point indenter without the purchase of a separate crimping tool. The dies of this invention may not require switching out for different sized lugs, thus reducing misplacement and loss. Three die halves can replace twenty standard U-dies, which can make dies of this invention more appealing to contractors.

Pullout strength of connections resulting from this invention increase by 33% with one crimp, and 15% with 2 crimps over traditional U-dies.

Embodiments of this invention allow for crimping of 1000 kcmil lugs and splices in a 12 ton hand or battery-operated crimping tool.

Embodiments of this invention allow a U-die taking crimping tool to have greater range, 1000 kcmil to #8 than current U-dies allow.

Embodiments of this invention allow versatility of U-die taking crimping tool to become a single-point indentor tool preferred by many users.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
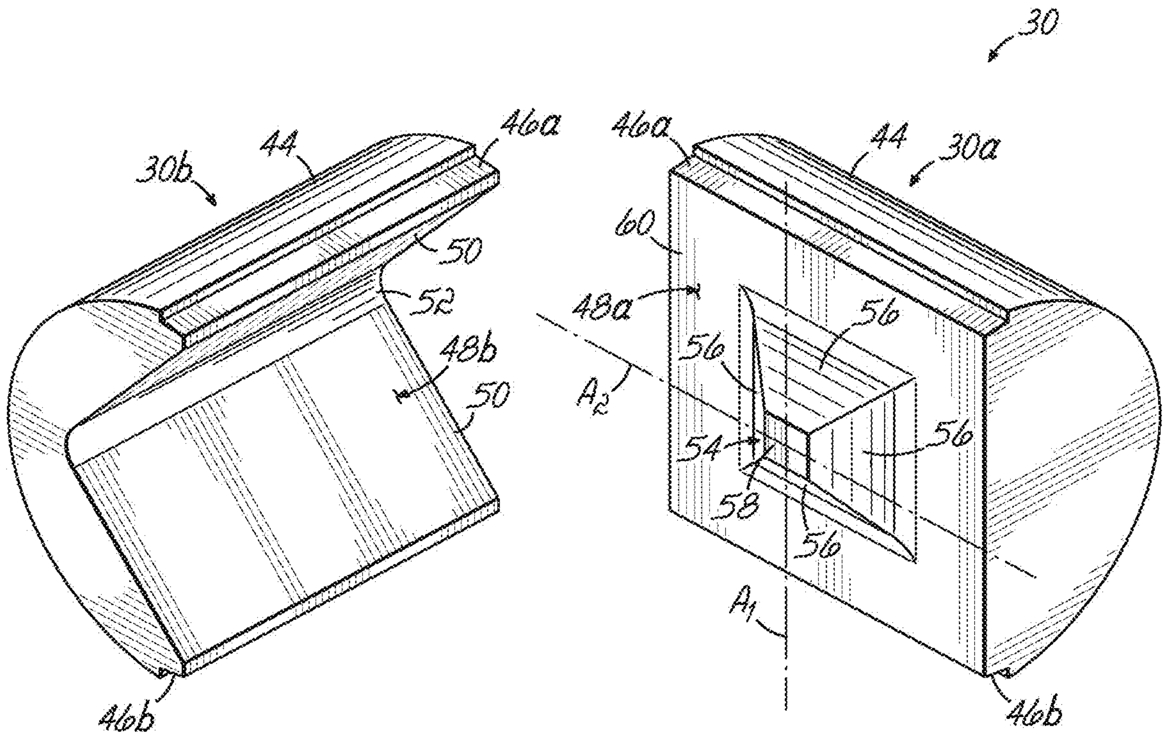
FIG. 1 is a perspective view of one embodiment of a die-set according to this invention.
Figure 1A:
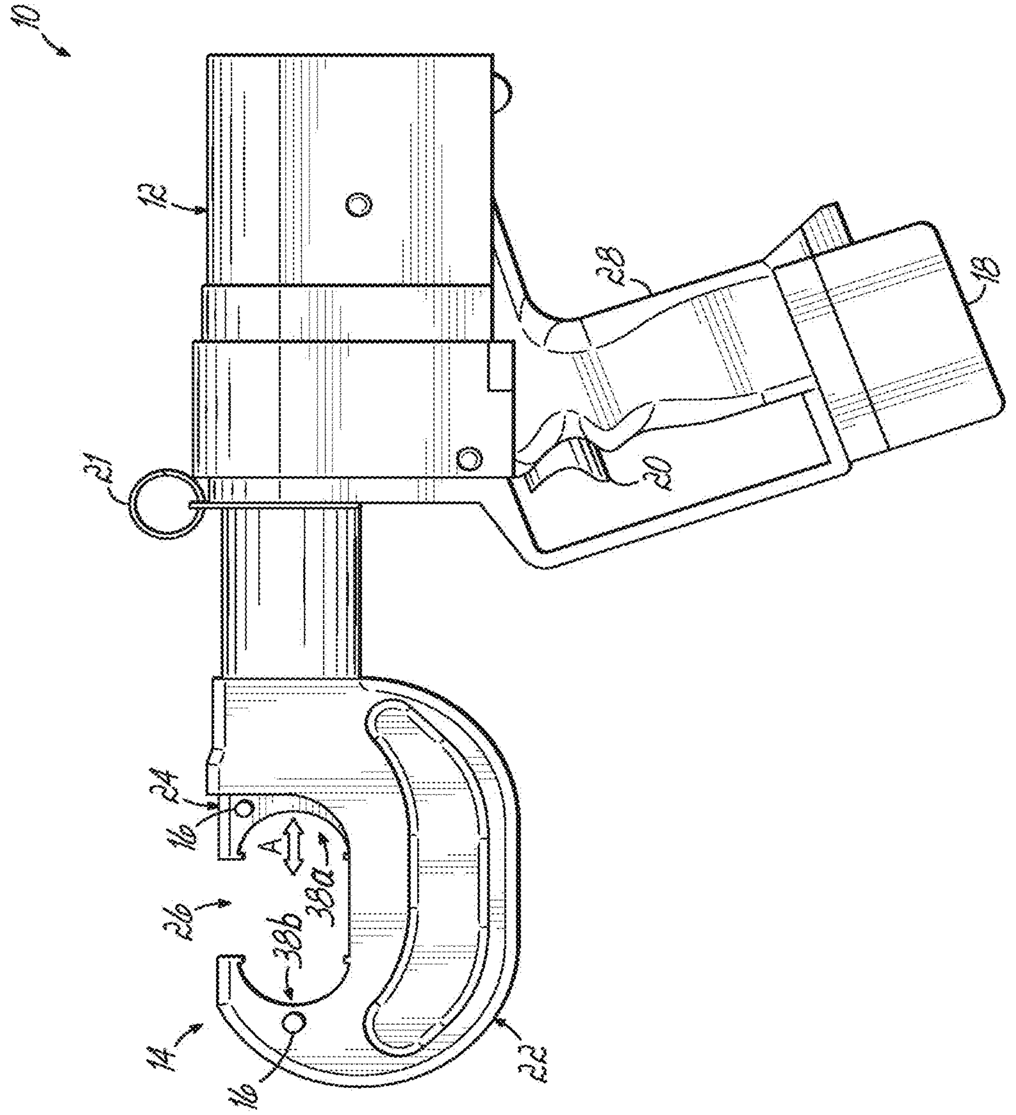
FIG. 1A is a perspective view of an exemplary crimping tool into which the die-set of FIG. 1 may be used.

A crimping tool and crimping die set commonly used in installing electrical connectors is depicted in FIGS. 1-1A. As shown in FIG. 1A, a conventional crimping tool 10 includes a housing 12, a working head 14, die release buttons 16, a battery 18, a trigger 20, and a ring 21. The housing 12 forms a handle 28. The battery 18 is removably connected to the bottom of the handle 28. The tool 10 can also include additional or alternative components. The housing 12 forms a ram hydraulic drive conduit system. The working head 14 may include a frame section 22 and a ram 24. The frame section 22 is stationarily connected to the front end of the housing 12, but could be rotatable. The ram 24 is movably connected to the frame section 22. The frame section 22 and the ram 24 are adapted to removably receive crimping dies 30 at a conductor receiving area 26. The crimping tool 10 shown and described herein is exemplary and this invention is not limited to any specific crimping tool. One crimping tool which may be used with this invention is model ILBC-12-LIO from Ilsco Corporation.

The ram 24 moves forward and backward axially as indicated by arrow A. The ram hydraulic drive conduit system is connected between a pump and the rear end of the ram 24. Hydraulic fluid pumped by the pump against the rear end of the ram 24 causes the ram 24 to move forward. A spring (not shown) returns the ram 24 to its rearward home position when hydraulic fluid pressure is released. The ram 24 moves between its rear position (FIG. 2) and its forward position (FIG. 3B).

Figure 2:
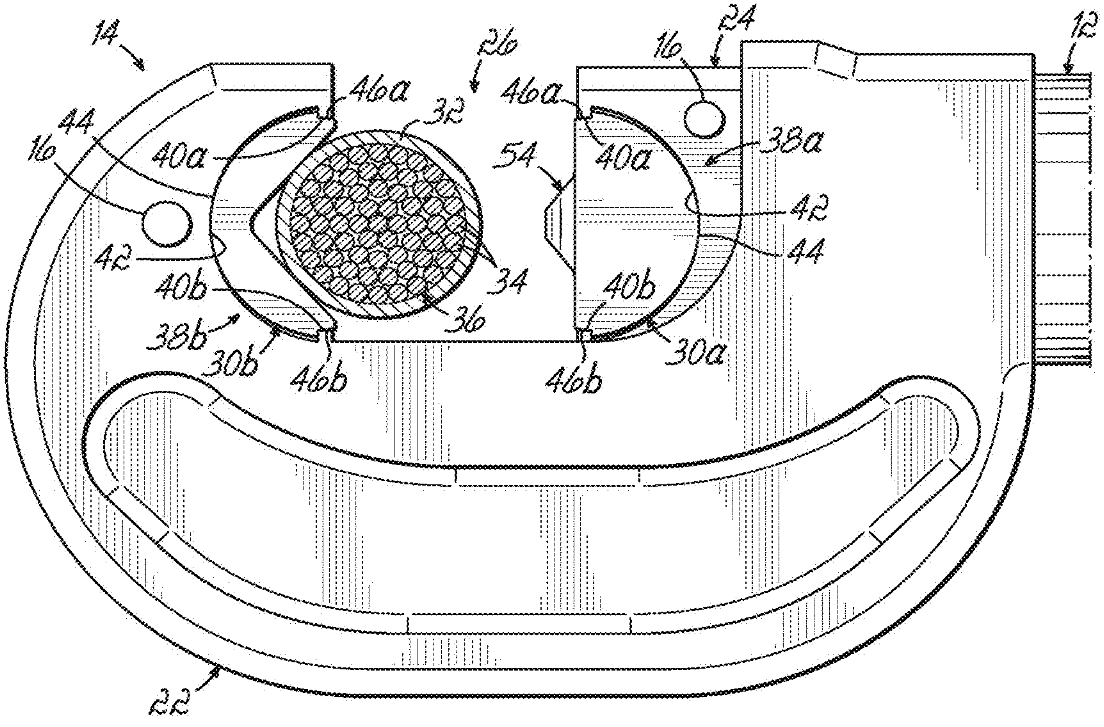
FIG. 2 is a side elevational view of the die-set of FIG. 1 installed into the jaws of the crimping tool of FIG. 1A.

Referring to FIGS. 1-2, one embodiment of a die set 30 for use in the crimping tool 10 is shown. The die set 30 and crimping tool 10 may be used to crimp an electrical connector such as a lug 32 shown in cross-section in FIG. 2 onto multiple wires 34 of a conductor 36 for electrical connection between the lug 32 and conductor 36. The die set 30 may have an upper indenter die 30*a* and a lower common die 30*b*. The upper die 30*a* may be mounted to the ram 24 of the crimping tool 10 according to various embodiments of this invention; however, since the crimping tool 10 can accept either die 30*a*, 30*b* in either location, the labels of upper die and lower die are for convenience in identification purposes.

The receiving 26 area of the crimping tool 10 has a pair of jaws 38 opposing one another. Each die 30 is removably mounted into one of the jaws 38. One jaw 38*b* is found on the frame 22 of the head 14 of the crimping tool 10 and one jaw 38*a* is found on the ram 24 of the tool 10. Each jaw 38 has a pair of opposed rails 40, one of which is oriented downwardly and one of which is oriented upwardly as shown in FIG. 2. Each jaw 38 has a curved or arcuate concave surface 42 extending between the associated rails 40 thereof.

An outer mating surface 44 of each die 30 is a generally curved or arcuate convex surface which is sized and configured to mate with the concave surface 42 of the jaws 38 when the die 30 is mated thereto. Each die 30 has a pair of grooves 46, one at each circumferential extent of the concave surface 44. One of the grooves of each die 30 is an upper groove 46*a* and the other groove of each die is a lower groove 46*b*. As seen in FIG. 2, the upper rail 40*a* of each jaw 38 is seated within the upper groove 46*a* and the lower rail 40*b* of that jaw 38 is seated within the lower groove 46*b* of the associated die 30 when the die 30 is mated with the jaw

38. The release button 16 may be depressed to release the die 30 from the associated jaw 38 as needed.

Each die 30 has a working surface 48 which confronts the working surface 48 of the opposing die 30 of the die set when the dies 30 are mounted in the crimping tool 10. According to various embodiments of this invention, the lower die 30*b* as a generally V-shaped working surface 48*b* when the die is viewed from the longitudinal end as in FIG. 2 or a cross-sectional view taken perpendicular to the grooves 46 of the die 30. The working surface 48*b* of the lower die 30*b* has a pair of generally planar and rectangular surfaces 50 joined together along a common longitudinal edge by a vertex 52 of the V-shape as seen in FIG. 2. The vertex 52 may have a rounded or other configuration according to various embodiments of this invention.

The working surface 48*a* of the upper die 30*a* according to various embodiments of this invention includes an indenting member 54, an example of which is seen in FIG. 1. The indenting member 54 of FIG. 1 is a generally pyramidal shaped member having four trapezoidal-shaped sides 56 which merge together at a square shaped, generally planar apex 58. The indenting member 54 projects from a generally planar, rectangular shaped base 60 of the working surface 48*a* of the upper die. The base 60 joins the upper and lower grooves 46 of the upper die 30*a* together in the embodiment of FIG. 1. The indenting member 54 is positioned generally equal distances from the upper and lower grooves 46 and laterally between the ends of the working surface 48. The indenting member 54 of various embodiments of this invention has two planes or axes of symmetry A1 and A2 as shown in FIG. 1 and other drawings.

As shown in the drawings, various embodiments of this invention form a single point indentation 62 in the lug or connector 32 and the conductor 36 positioned therein. The single point indentation 62 provides a crimp of sufficient strength and versatility to facilitate removal of the crimped lug or connector 32 and conductor 36 from the crimping tool 10. The die sets 30 of this invention allow for removal of the crimped connector 32 and conductor 36 from 12 ton hand or battery operated tools 10. Single point indentations 62 are preferred by many in the industry and with the components of this invention, the distance within receiving area 26 allows for removal of the crimped members with standard tools 10. 1000 kcmil to #8 connectors 32 may be effectively crimped in such tools 10 and easily removed therefrom.

Figure 3A:
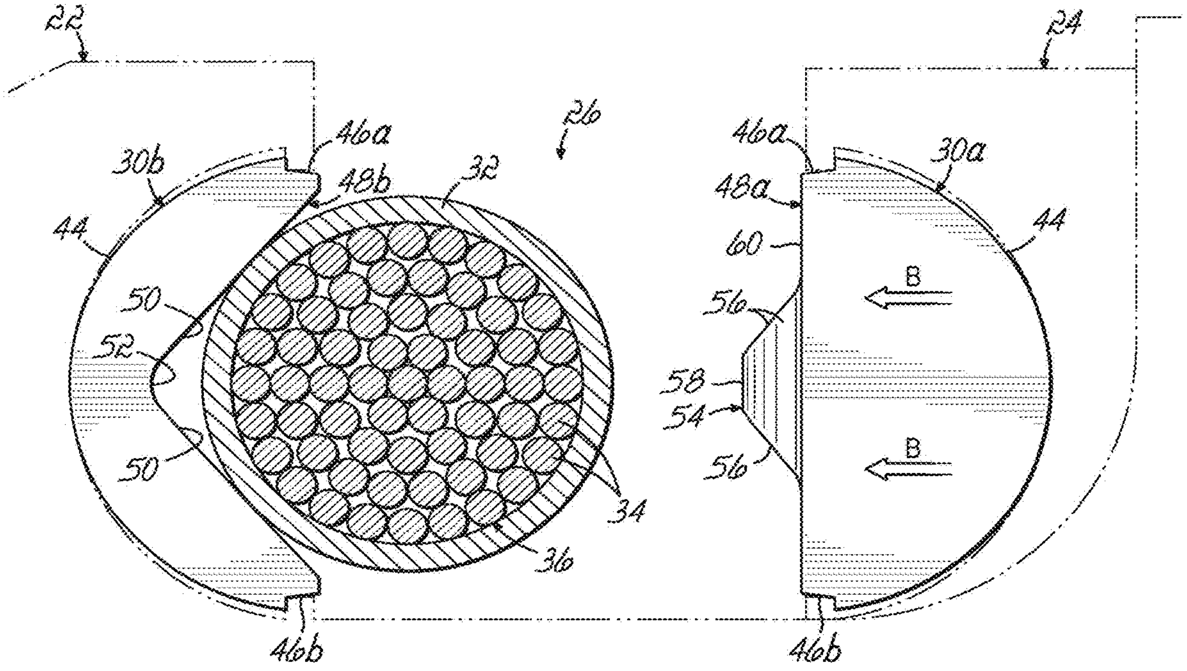
FIG. 3A is a cross-sectional view of the arrangement of FIG. 2 with a conductor and lug positioned in the jaws of the crimping tool.
Figure 3B:
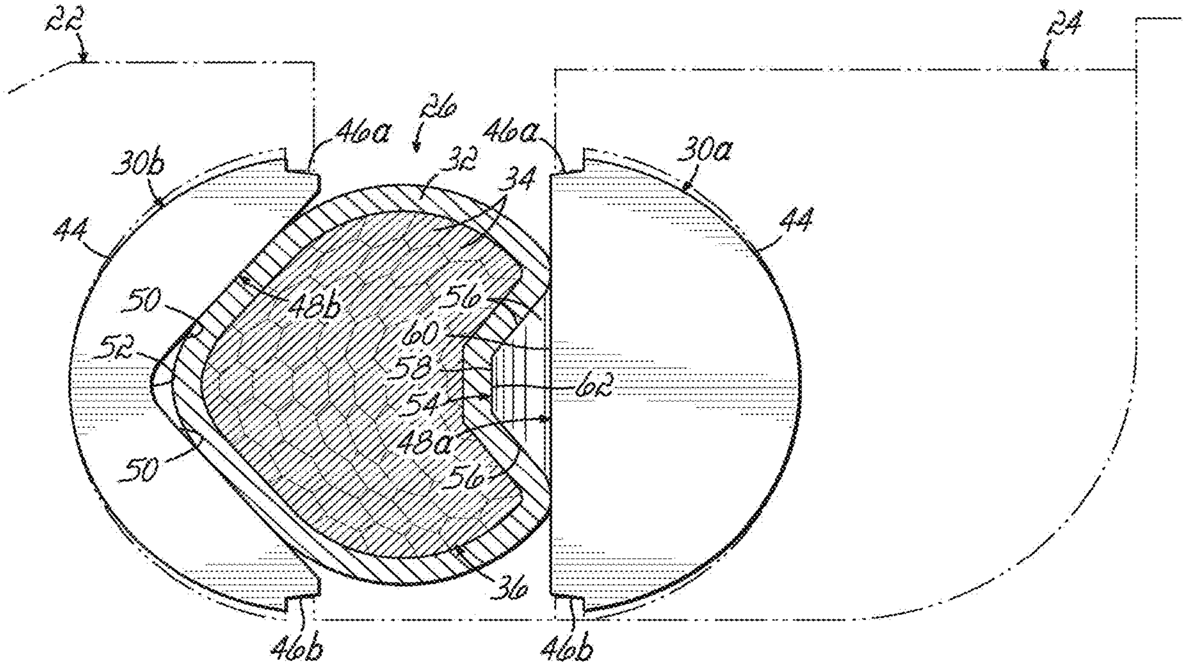
FIG. 3B is a view similar to FIG. 3A with the jaws and die-set crimping the conductor and lug.
Figure 3C:
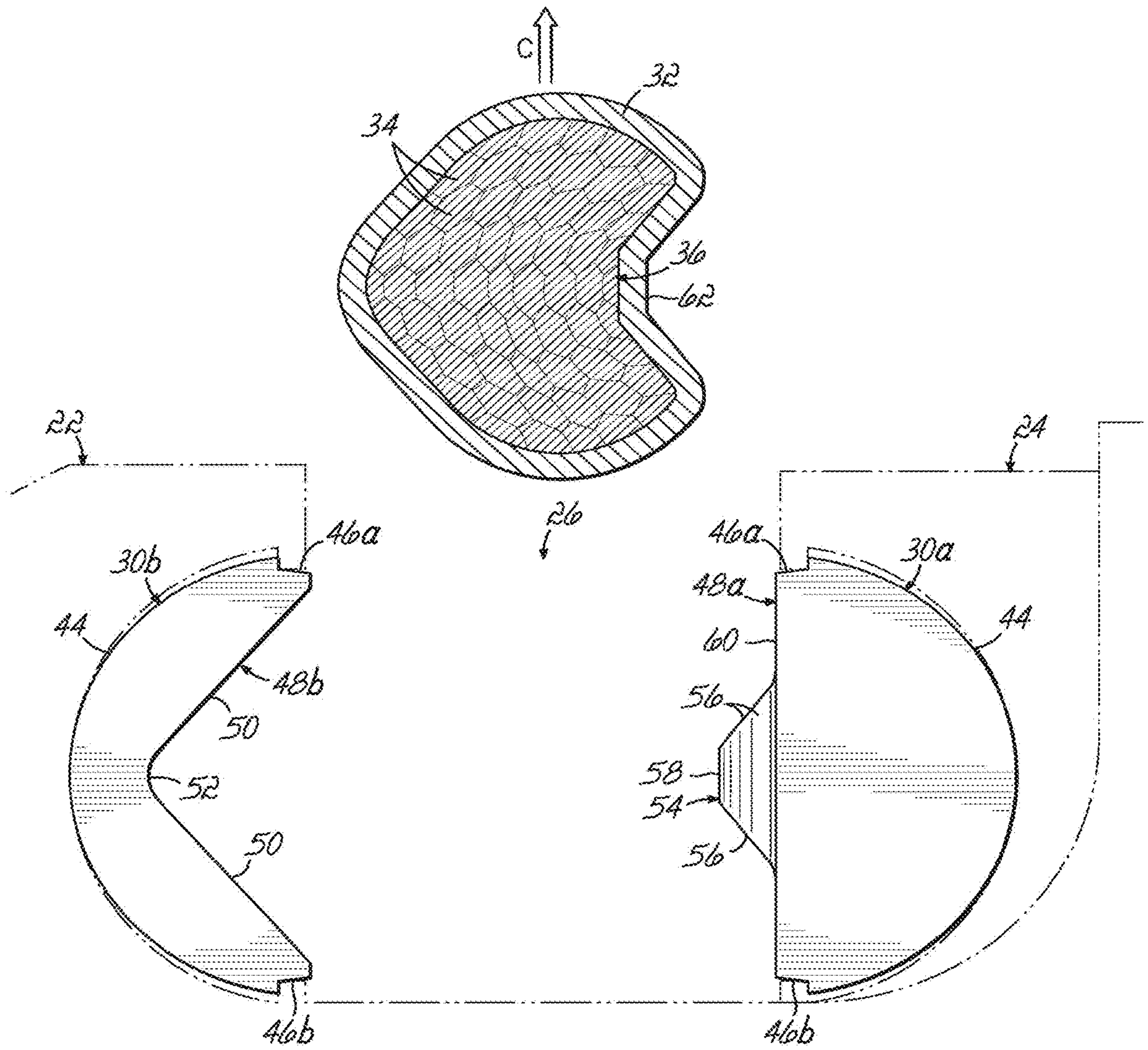
FIG. 3C is a view similar to FIGS. 3A-3B with the crimped conductor and lug being removed from the jaws.

FIGS. 3A-3C are sequential views of the lug 32 and conductor 36 being crimped by the die set 30 of FIG. 1 and the crimping tool 10 and then removed from the receiving area 26 between the dies 30 in the crimping tool 10. The arrangements of FIGS. 2 and 3A are similar and represent the maximum extent of the receiving area 26 with the ram 24 and upper die 30*a* mounted in the associated jaw 38 at the home position fully retracted from the lower die 30*b* and associated jaw 38 of the crimping tool 10. In FIG. 3B, the position of the upper die 30*a* relative to the lower die 30*b* has decreased with the ram 24 of the crimping tool 10 being actuated by a user depressing the trigger 20. The relative movement of the dies 30 toward each other, as indicated by arrows Bin FIG. 3A in one embodiment, crimps the lug 32 and conductor 36 therebetween as seen in FIG. 3B. The portion of the lug 32 and wires 34 of the conductor 36 adjacent thereto are deformed into a generally V-shaped configuration similar to the working surface 48*b* of the lower die 30*b*. Similarly, the portion of the lug 32 confronting the upper die 30*a* and the adjacent wires 34 of the conductor 36 are deformed by the indenting member 54 and base 60 of the working surface 48*a* of the upper die 30*a*. The indenting member 54 forms an indentation 62 in the lug 32 and adjacent wires 34 of the conductor 36.

After the ram 24 and upper die 30*a* mounted thereto has completed the crimping action and/or traveled to the furthest extent of the ram 24, the ram 24 is retraced toward home position to unseat the crimped surfaces of the lug 32 from the respective working surfaces 48 of the die set 30. This allows for removal of the crimped lug and conductor from the receiving area 26 of the crimping tool 10, such as in the direction of arrow C as seen in FIG. 3C.

Advantageously, the configuration of the dies 30 and associated working surfaces 48 of the die set 30 allows for a secure crimp of a variety of lug 32 and conductor 36 sizes, including large sizes which would otherwise require a different tool and/or die set for such larger sizes thereby increasing the required inventory of dies and/or crimping tools to securely crimp larger diameter lugs and conductors.

Figure 4:
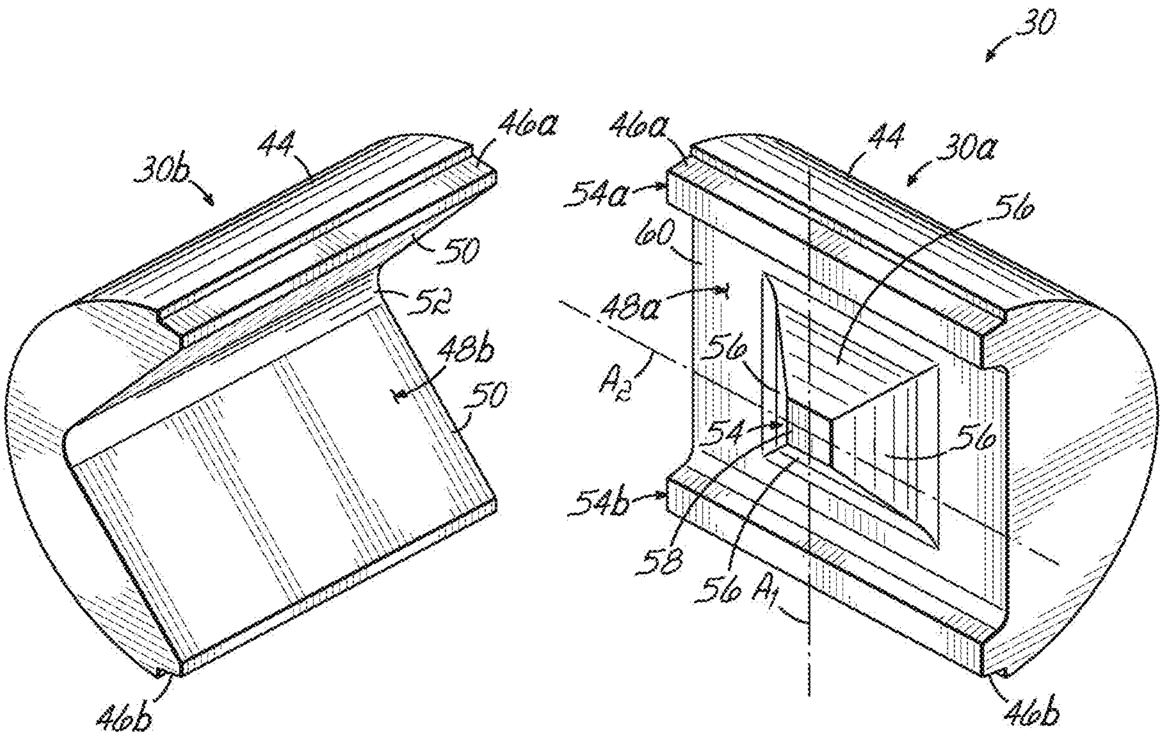
FIG. 4 is a perspective view of a second embodiment of a die-set according to this invention.
Figure 5:
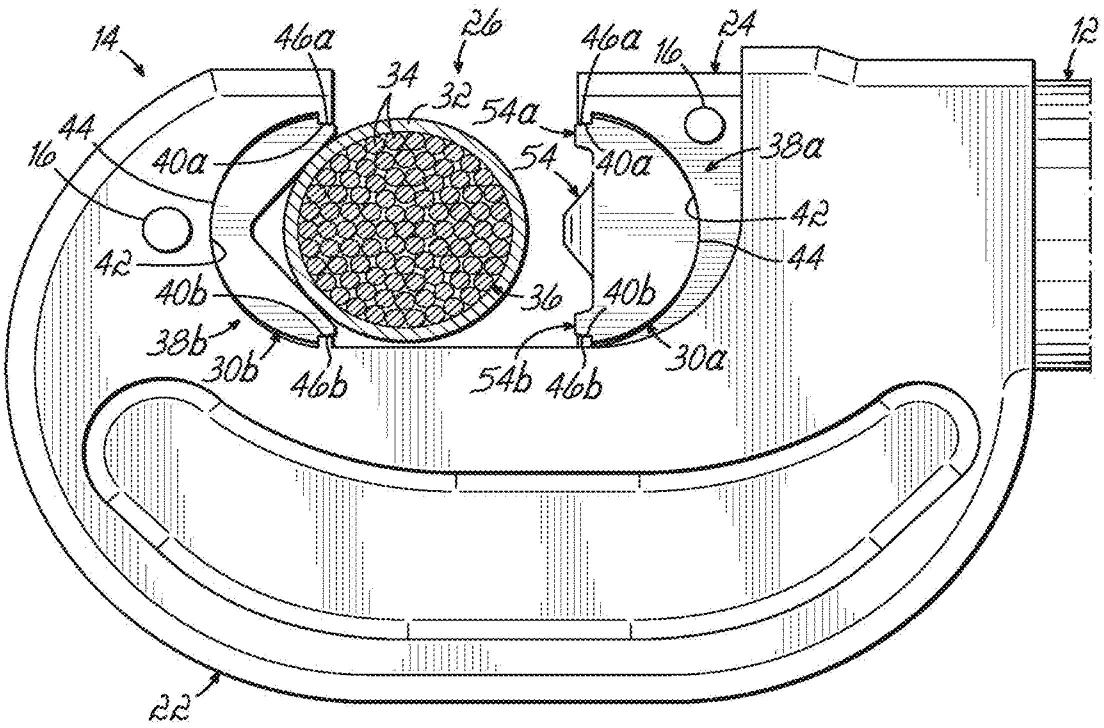
FIG. 5 is a side elevational view of the die-set of FIG. 4 installed into the jaws of the crimping tool.
Figure 6A:
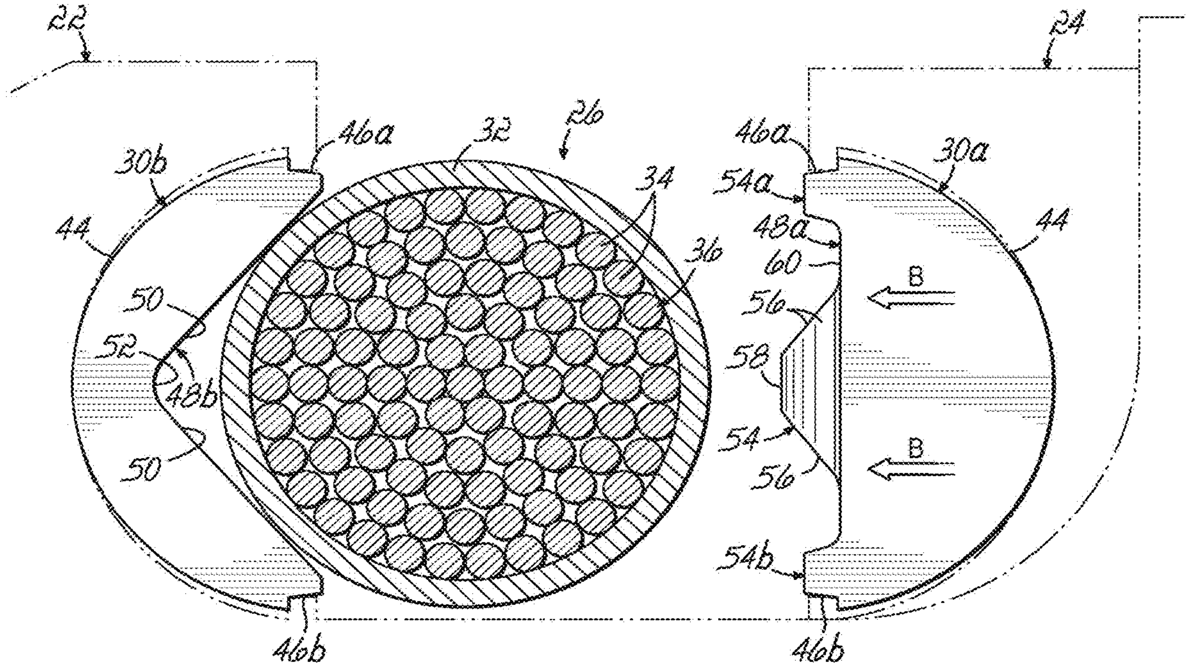
FIG. 6A is a cross-sectional view of the arrangement of FIG. 5 with a conductor and lug positioned in the jaws of the crimping tool.
Figure 6B:
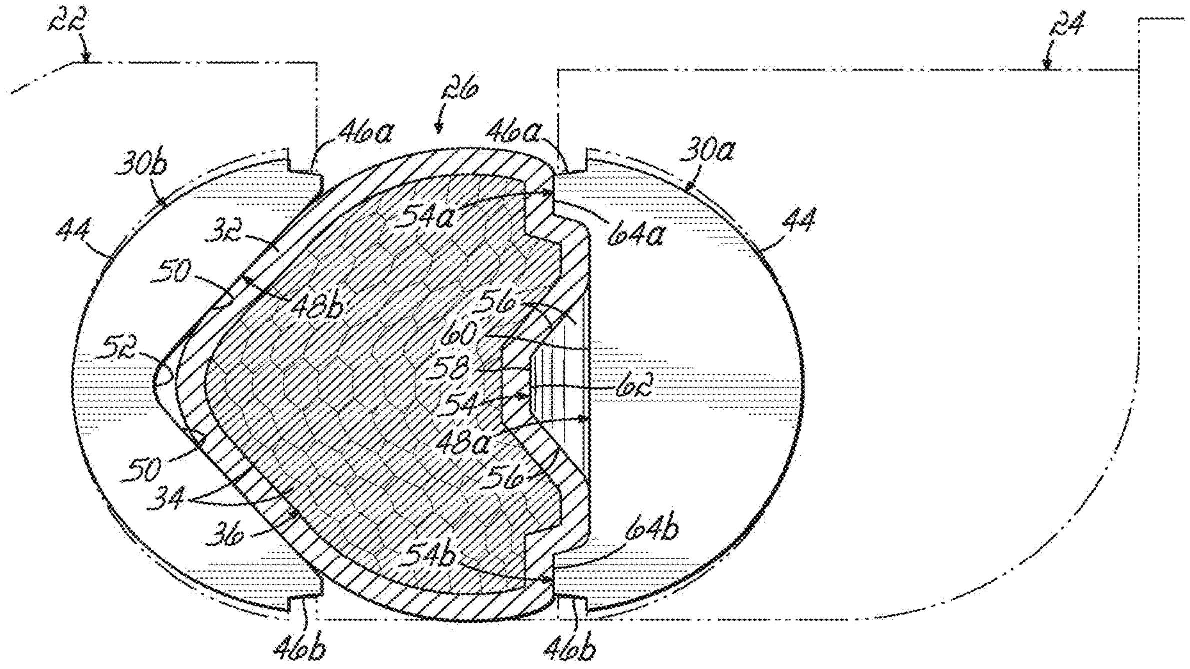
FIG. 6B is a view similar to FIG. 6A with the jaws and die-set crimping the conductor and lug.
Figure 6C:
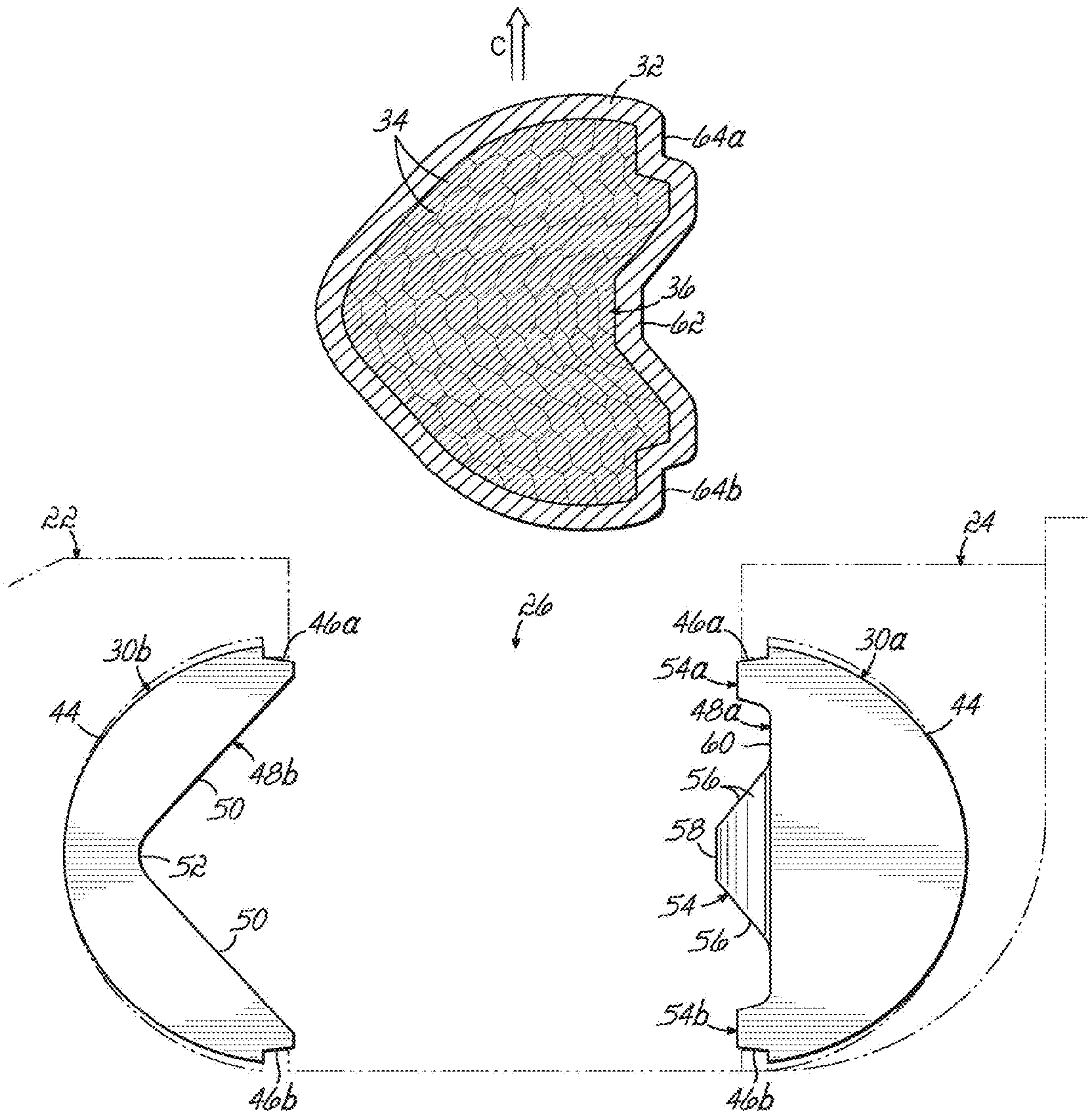
FIG. 6C is a view similar to FIGS. 6A-6B with the crimped conductor and lug being removed from the jaws.

A second embodiment of a die set 30 according to this invention is show in FIG. 4 with the die set 30 mated with the crimping tool 10 shown in FIG. 5. Elements of the die set 30, crimping tool 10, lug 32 and conductor 36 similar to those of the earlier embodiment are identified by similar reference numerals. The lower die 30*b* of the die set 30 of FIG. 4 is similar to or the same as the lower die 30*b* of the die set 30 of FIG. 1. The upper die 30*a* of FIG. 4 differs from the upper die of FIG. 1 by the addition of added indenting members in the form of a pair of rims 54*a*, 54*b* each projecting forwardly from the base 60 at a juncture between the base 60 and the associated groove 46 of the upper die 30*a*. The rims 54*a*, 54*b* form recesses 64*a*, 64*b* in the lug 32 and adjacent wires 34 of the conductor 36 as shown in FIGS. 6B an 6C. The height of each rim 54*a*, 54*b* is less than that of the pyramidal shaped indenting member 54 in the embodiment of FIGS. 4-6C, although other configurations and shapes are within the scope of this invention.

Figure 7:
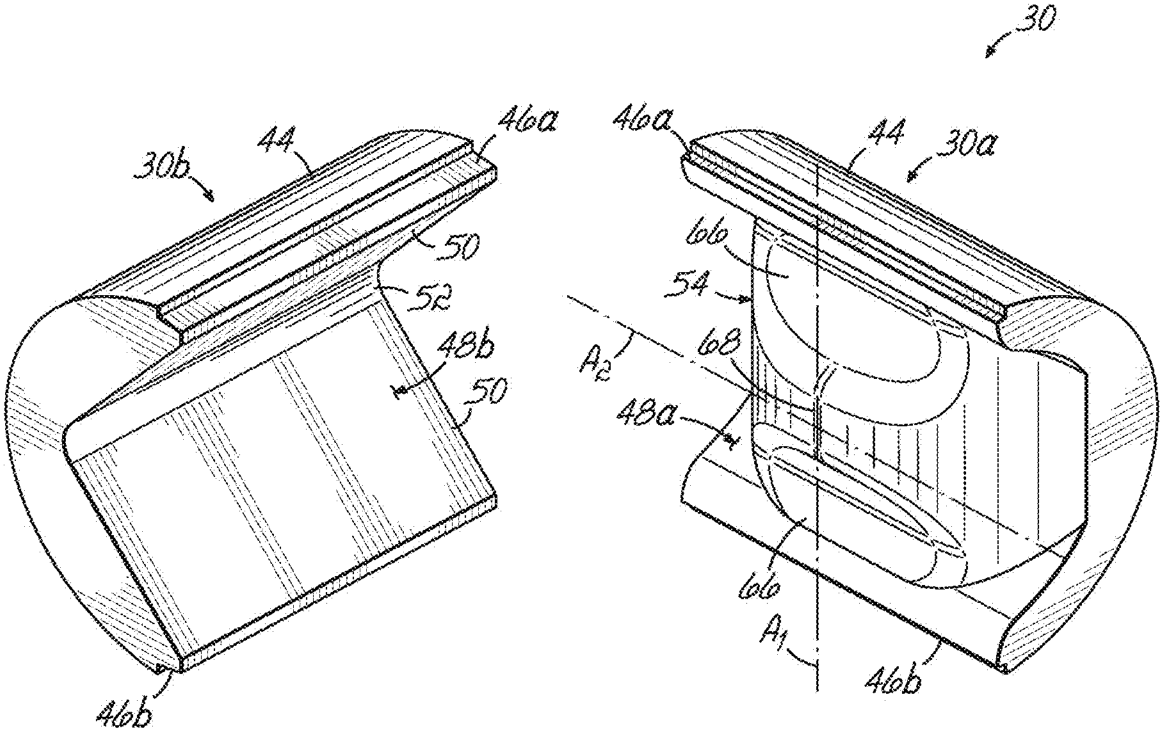
FIG. 7 is a perspective view of a third embodiment of a die-set according to this invention.
Figure 8:
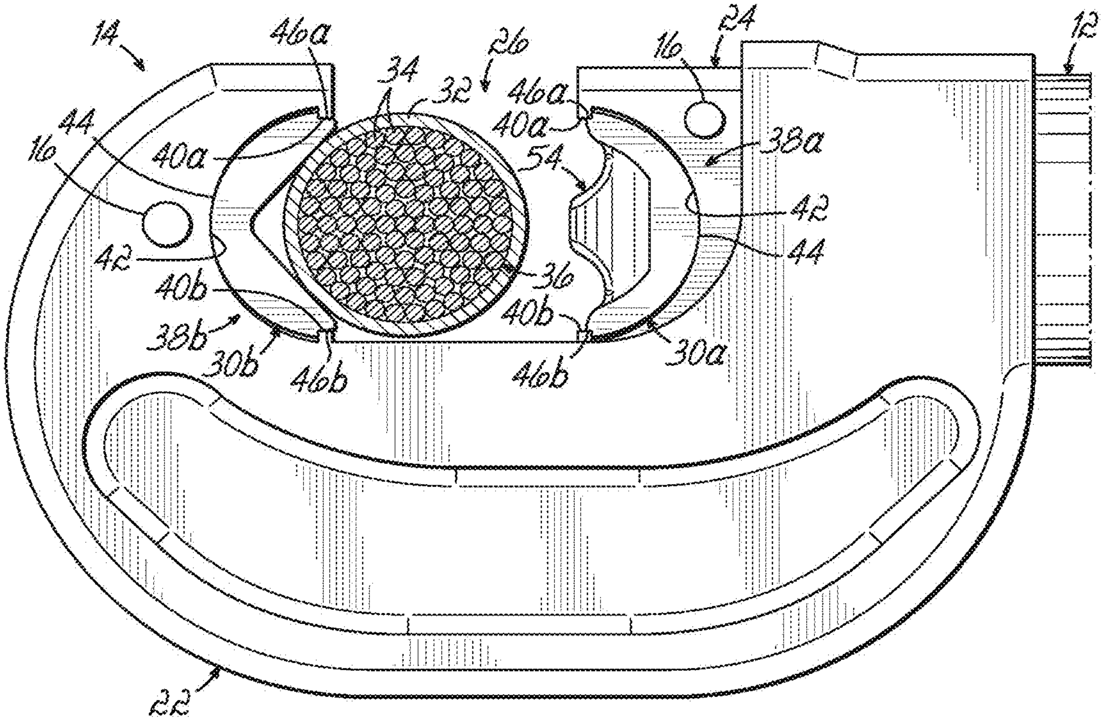
FIG. 8 is a side elevational view of the die-set of FIG. 7 installed into the jaws of the crimping tool.
Figure 9A:
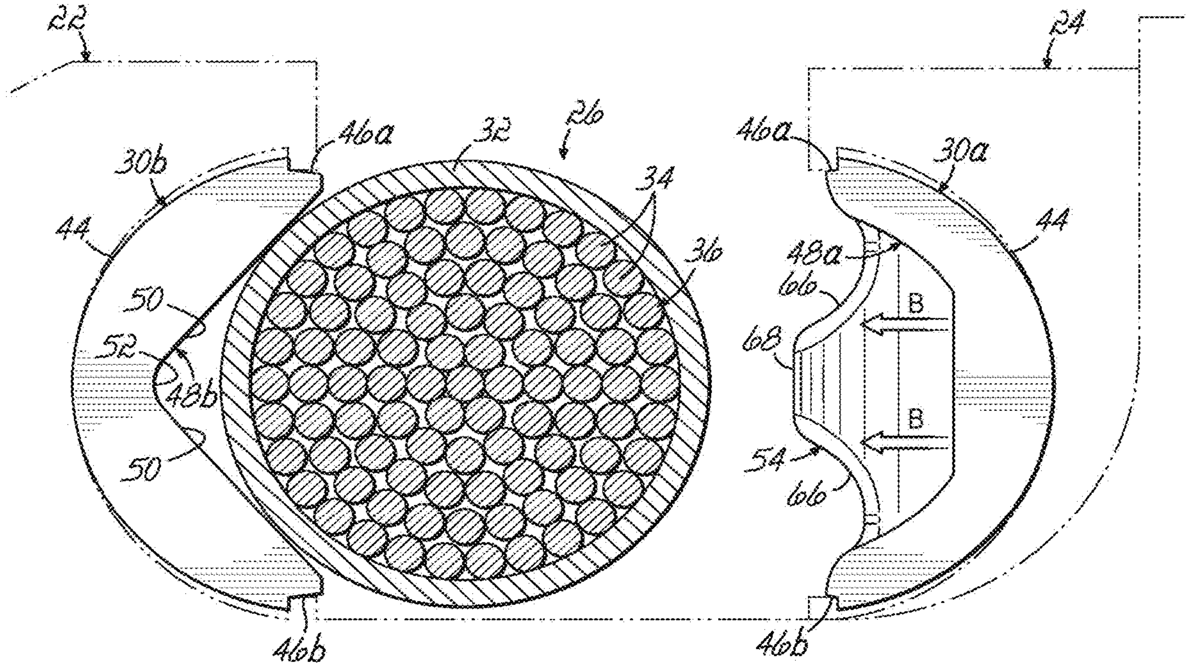
FIG. 9A is a cross-sectional view of the arrangement of FIG. 8 with a conductor and lug positioned in the jaws of the crimping tool.
Figure 9B:
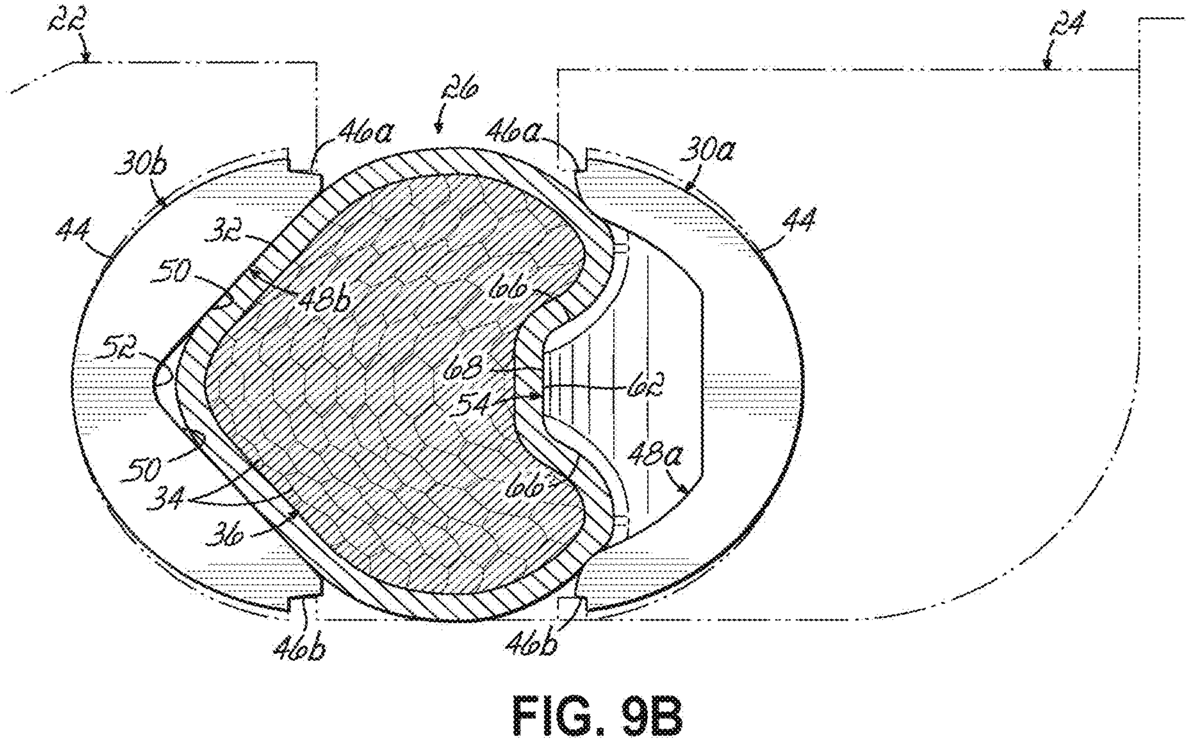
FIG. 9B is a view similar to FIG. 9A with the jaws and die-set crimping the conductor and lug.
Figure 9C:
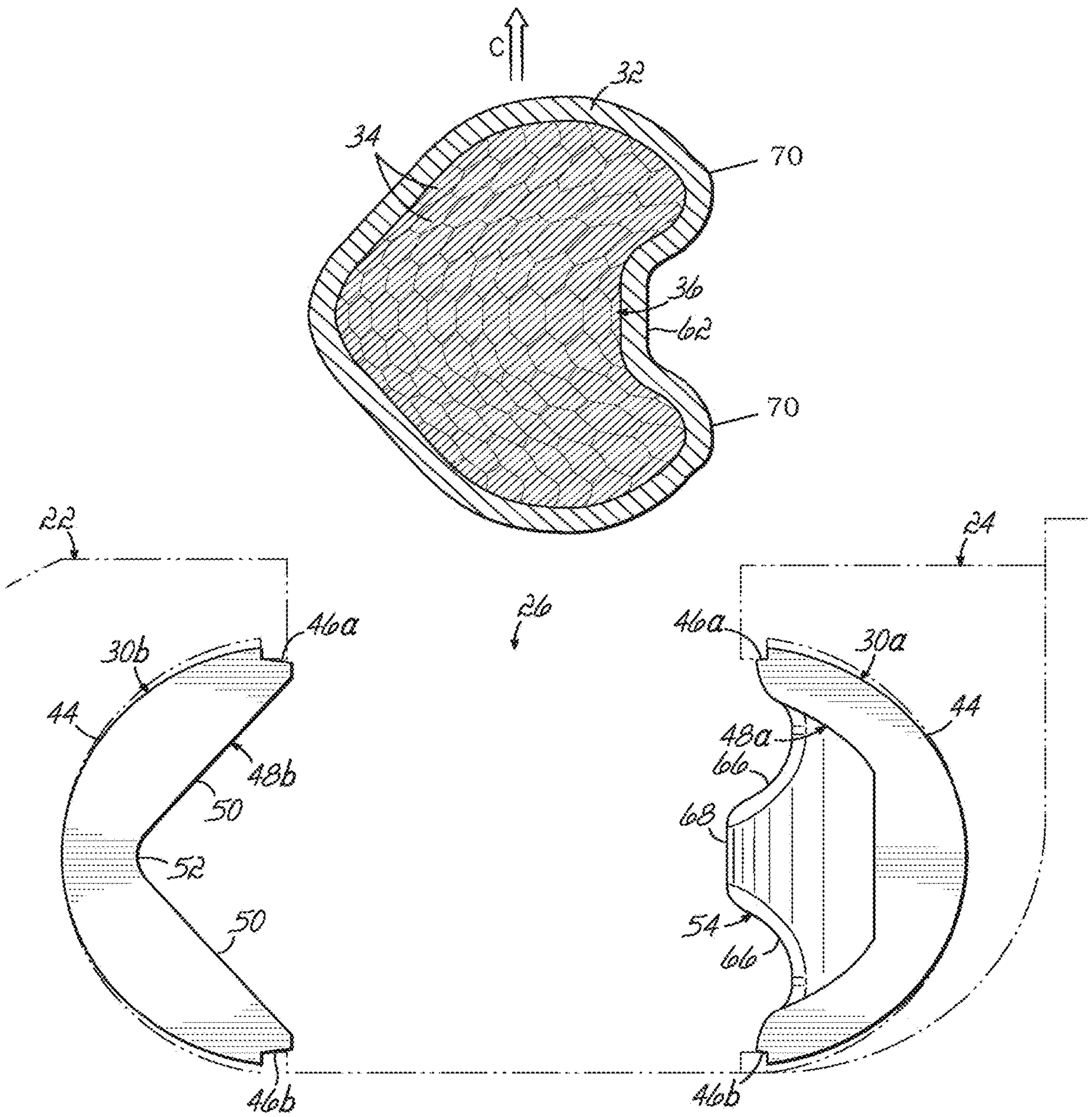
FIG. 9C is a view similar to FIGS. 9A-9B with the crimped conductor and lug being removed from the jaws.
Figure 10:
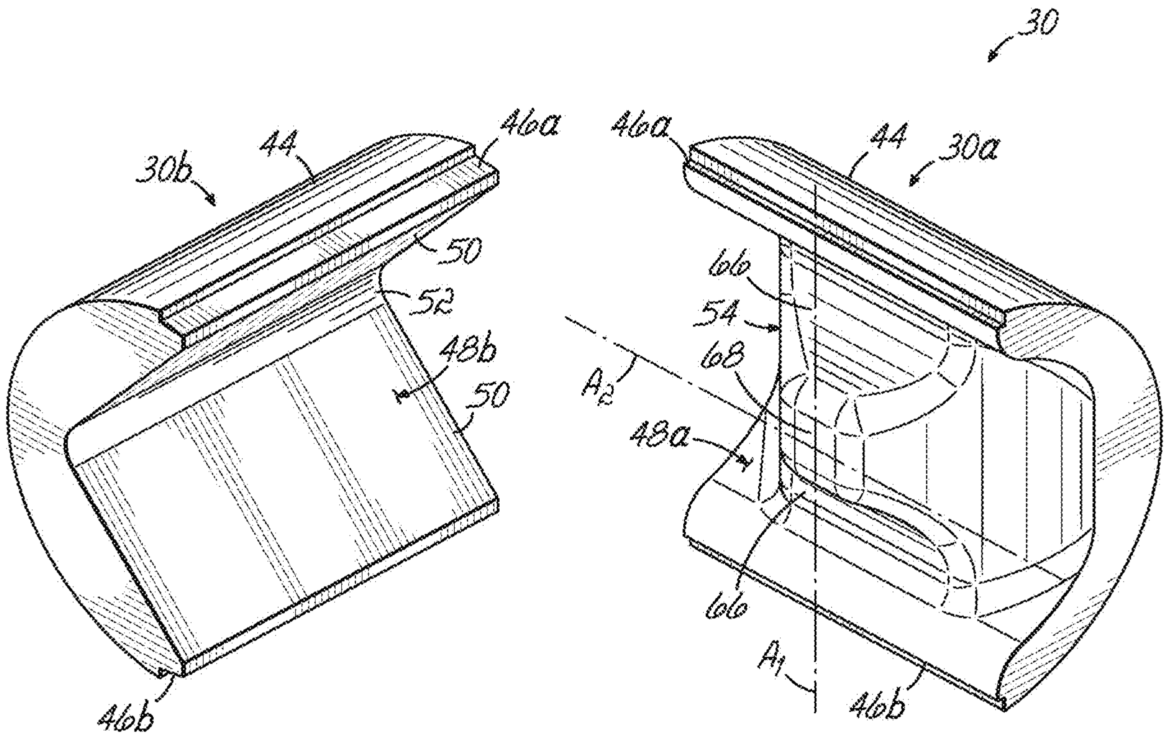
FIG. 10 is a perspective view of a fourth embodiment of a die-set according to this invention.

A third embodiment of a die set 30 according to this invention is shown in FIG. 7 with the die set 30 mated with the crimping tool 10 shown in FIG. 8. Elements of the die set 30, crimping tool 10, lug 32 and conductor 36 similar to those of the earlier embodiments are identified by similar reference numerals. The lower die 30*b* of the die set 30 of FIG. 4 is similar to or the same as the lower die 30*b* of the die set 30 of FIGS. 1 and 4. The upper die 30*a* of FIG. 7 differs from the upper dies 30*a* of FIGS. 1 and 4 by the shape of the indenting member 54 on the working surface 48*a*, which includes faces with a combination of concave portions and convex portions as shown in the side views of FIGS. 8-9B in particular. The indenting member 54 of the upper die 30*a* of the die set 30 of FIG. 7 is a saddle shaped member with a pair of generally oval shaped pockets 66 spaced on either side of a laterally oriented ridge 68 and including respective concave portions that transition to convex portions. Each of the oval shaped pockets 66 is adjacent to one of the grooves 46 of the upper die 30*a*. The indenting member 54 of the upper die 30*a* of FIG. 7 forms a central indentation 62 in the lug 32 bordered on the upper and lower portions of the lug 32 by rounded protrusions 70 as shown in FIG. 9C, with the central indentation 62 thus including convex and concave portions that correspond, respectively to the concave and convex portions of the indenting member 54

Figure 11:
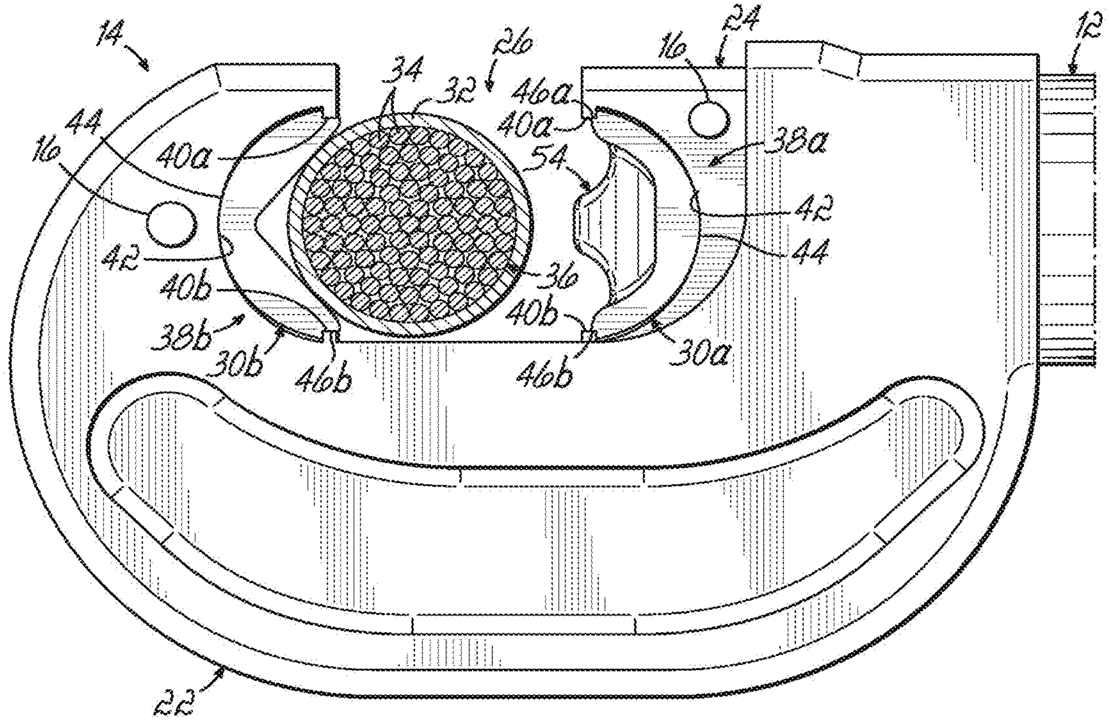
FIG. 11 is a side elevational view of the die-set of FIG. 10 installed into the jaws of the crimping tool.
Figure 12A:
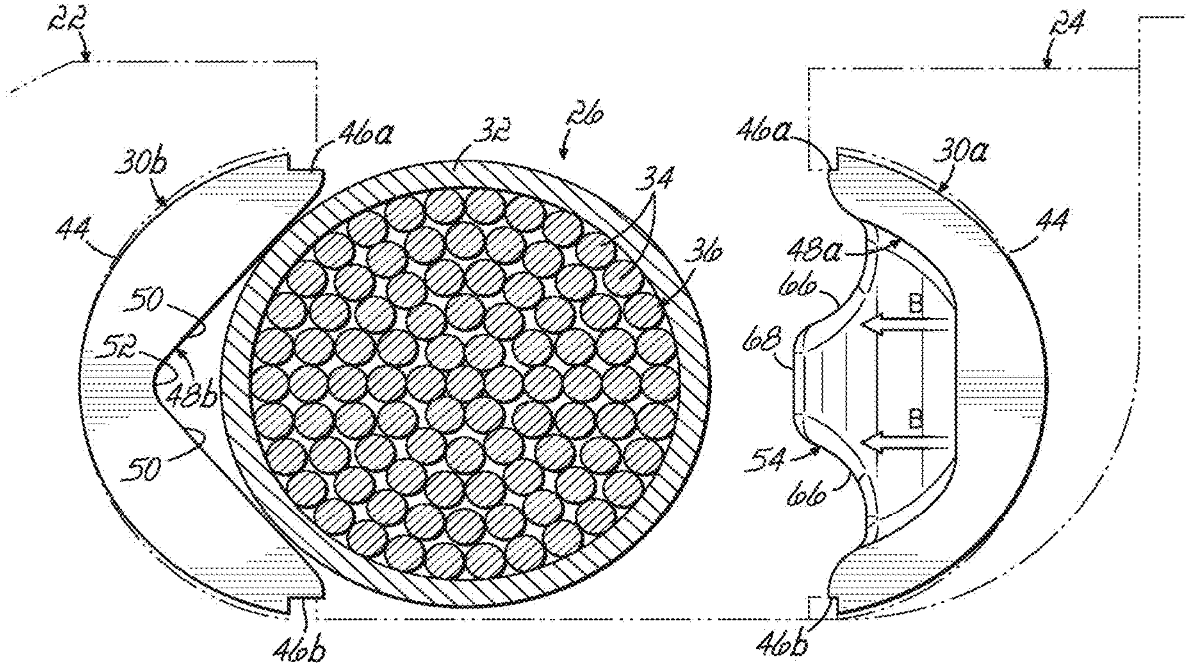
FIG. 12A is a cross-sectional view of the arrangement of FIG. 11 with a conductor and lug positioned in the jaws of the crimping tool.
Figure 12B:
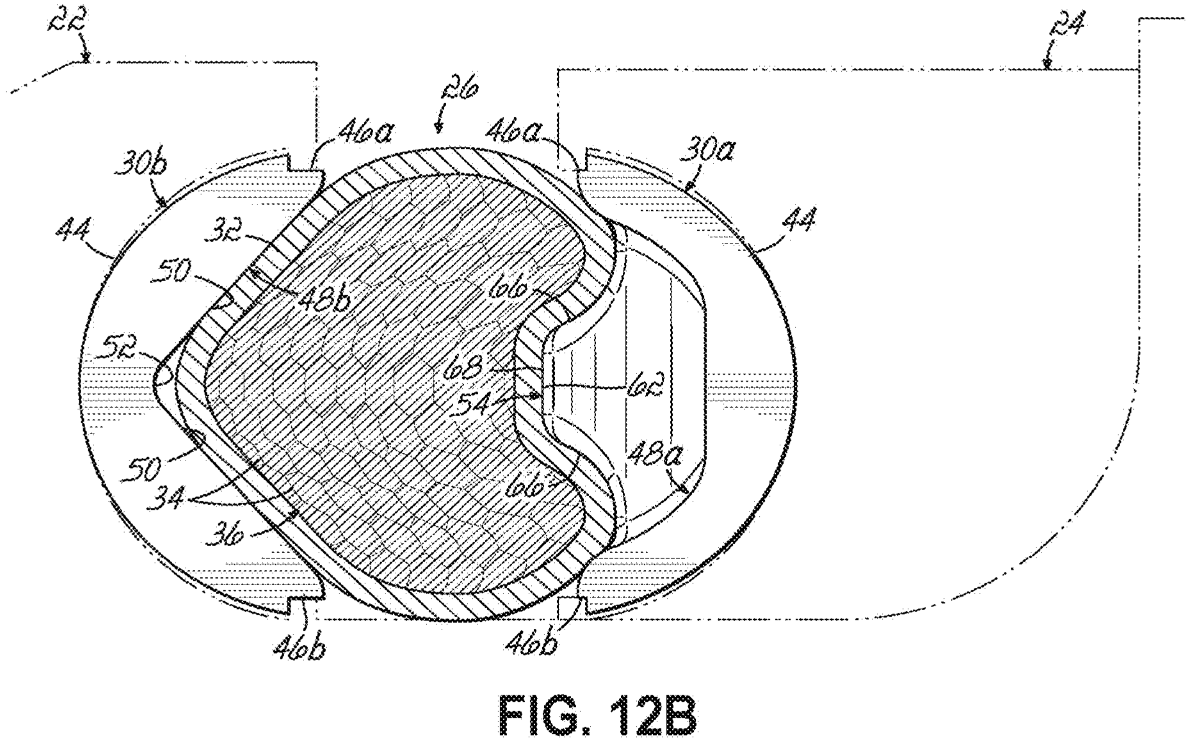
FIG. 12B is a view similar to FIG. 12A with the jaws and die-set crimping the conductor and lug.
Figure 12C:
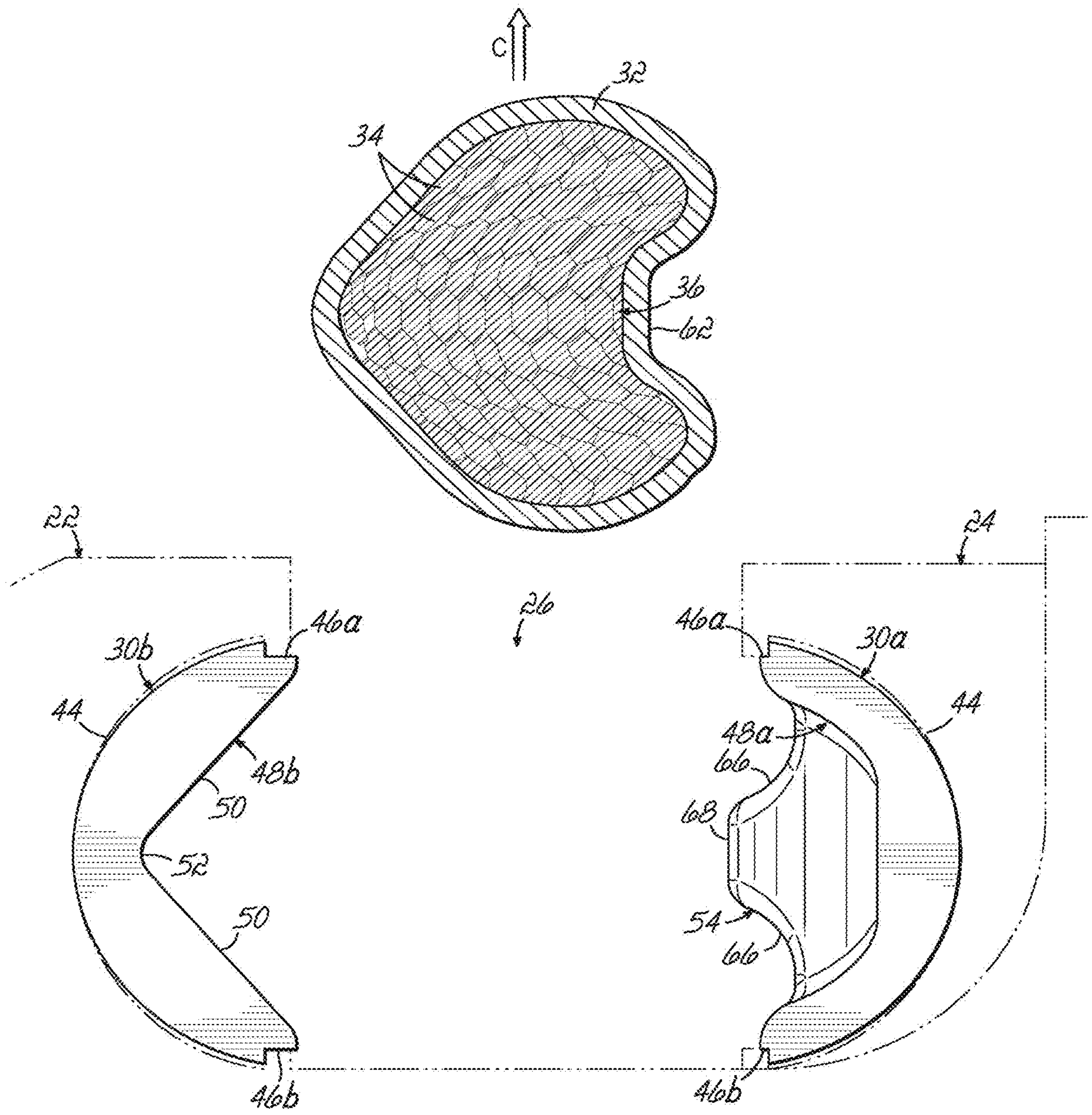
FIG. 12C is a view similar to FIGS. 12A-12B with the crimped conductor and lug being removed from the jaws.
Figure 13:
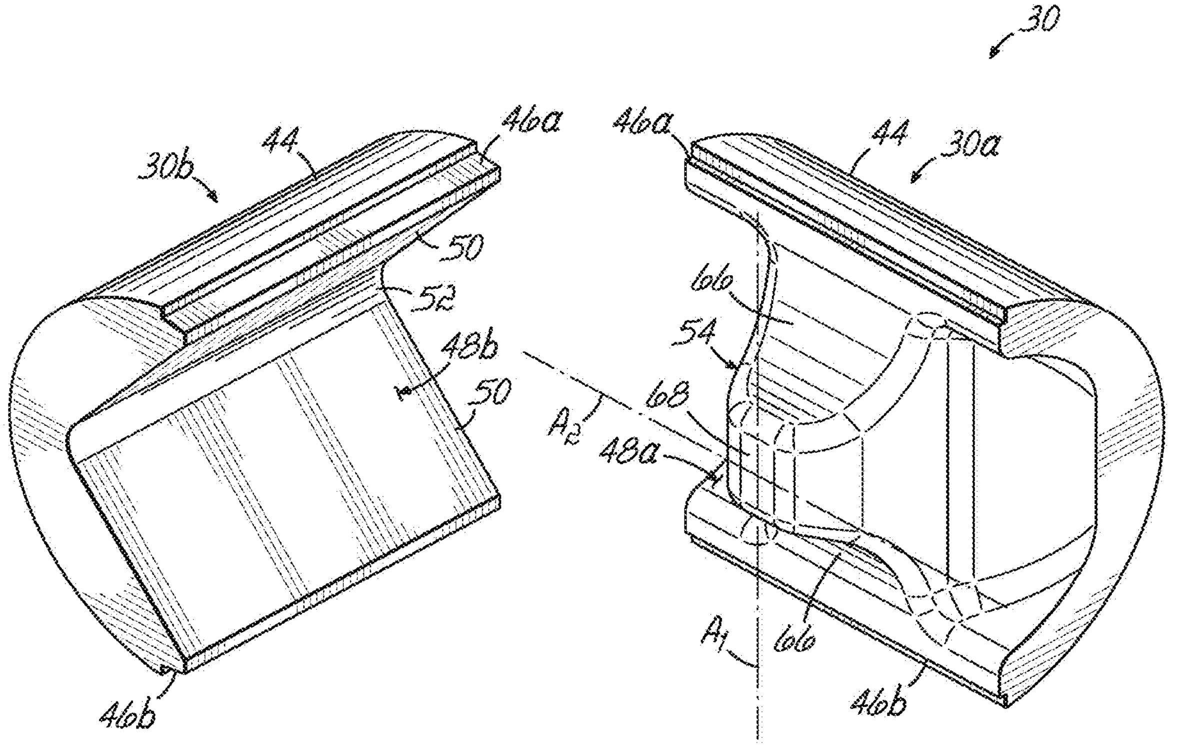
FIG. 13 is a perspective view of a fifth embodiment of a die-set according to this invention.
Figure 14:
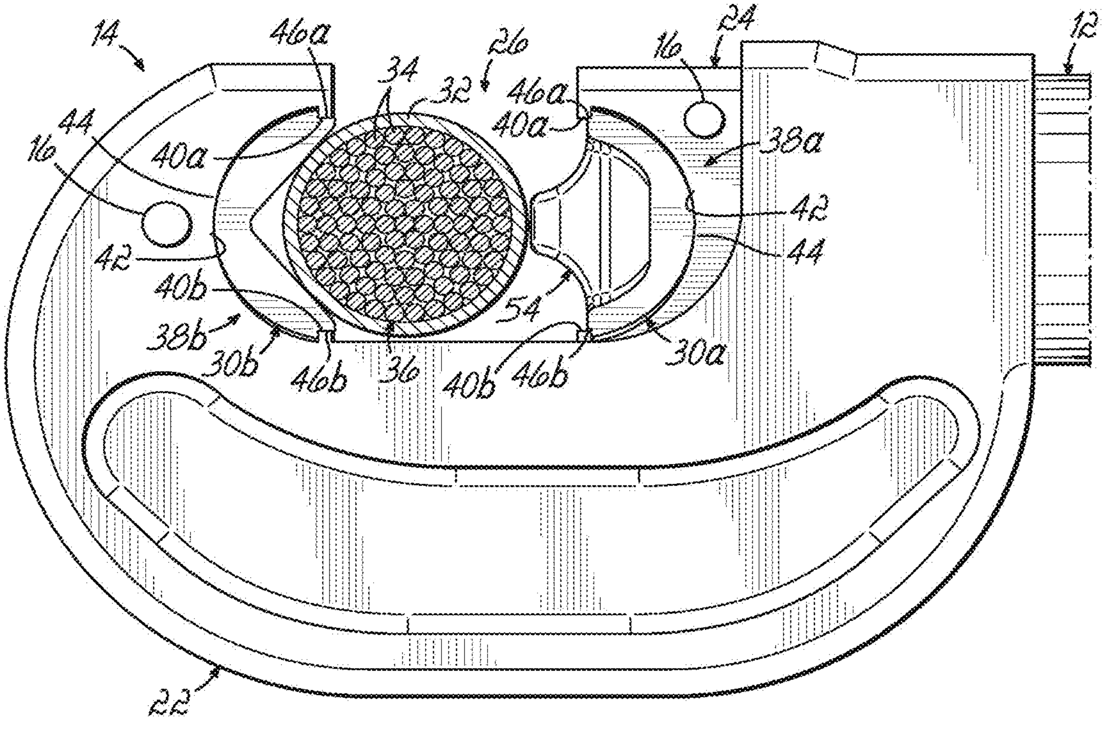
FIG. 14 is a side elevational view of the die-set of FIG. 13 installed into the jaws of the crimping tool.
Figure 15A:
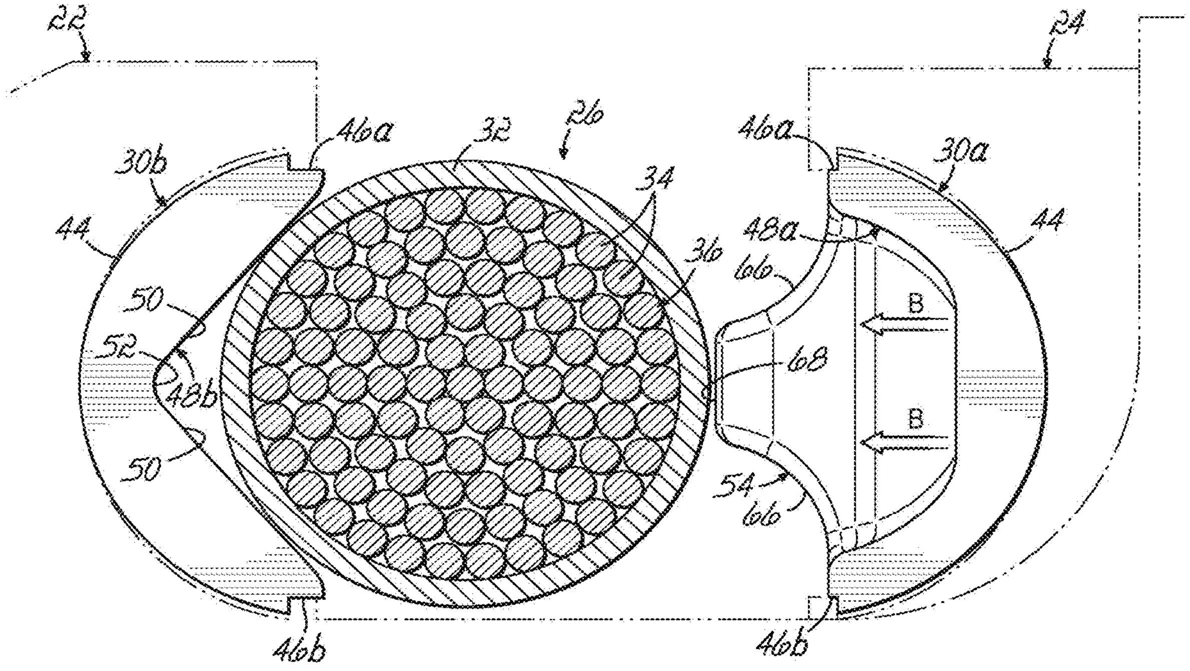
FIG. 15A is a cross-sectional view of the arrangement of FIG. 14 with a conductor and lug positioned in the jaws of the crimping tool.
Figure 15B:
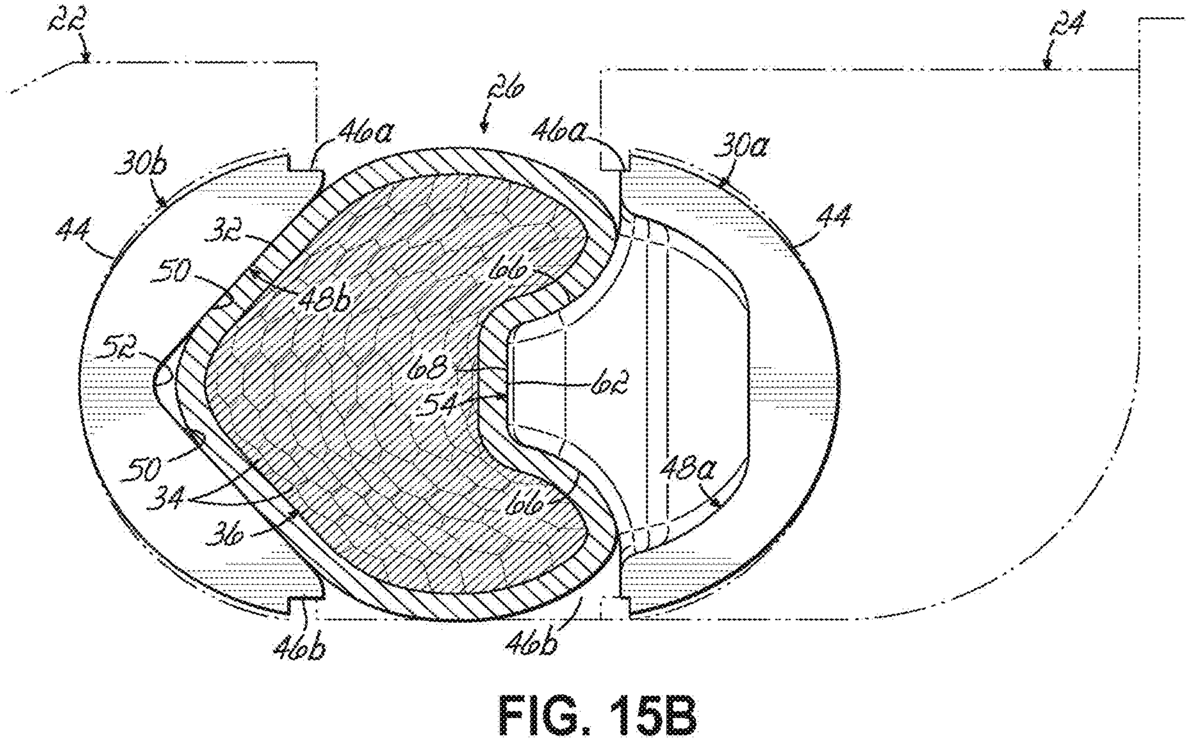
FIG. 15B is a view similar to FIG. 15A with the jaws and die-set crimping the conductor and lug.
Figure 15C:
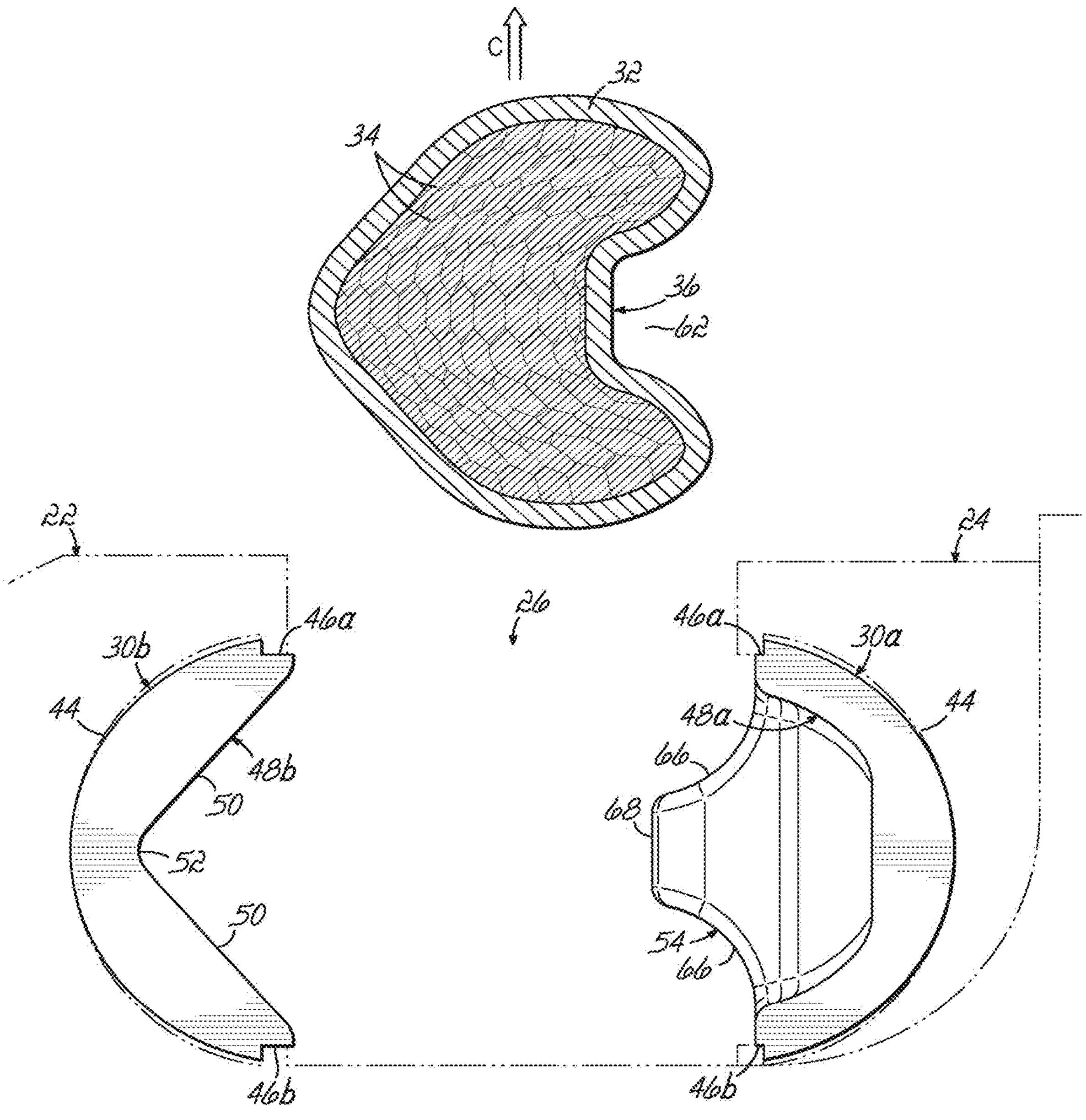
FIG. 15C is a view similar to FIGS. 15A-15B with the crimped conductor and lug being removed from the jaws.

A fourth and fifth embodiment of a die set 30 according to this invention is show in FIGS. 10 thru 15C with the die set 30 mated with the crimping tool 10 shown in FIGS. 11 and 14. Elements of the die set 30, crimping tool 10, lug 32 and conductor 36 similar to those of the earlier embodiments are identified by similar reference numerals. The lower die

30*b* of the die set 30 of FIG. 4 is similar to or the same as the lower die 30*b* of the die set 30 of FIGS. 1 and 4. The upper dies 30*a* of FIGS. 10 and 13 differs from the upper dies 30*a* of FIGS. 1 and 4 by the shape of the indenting member 54 on the working surface 48*a* as shown in FIGS. 10-15C. The indenting member 54 of the embodiments shown in FIGS. 10-15C are similar to each other with the member 54 of FIGS. 10-12C being less pronounced than the member 54 in FIGS. 13-15C. Each of these embodiments of the indenting member 54 has the pair of shaped pockets 66 spaced on either side of the protruding ridge 68. The outermost face of the ridge 68 of the embodiment in FIGS. 10-12C is generally square while the outermost face of the ridge 68 of the embodiment of FIGS. 13-15C is rectangular.

The various embodiments of the die sets 30 according to this invention each offer the secure crimp of a variety of lug 32 and conductor 36 sizes, including large sizes which would otherwise require a different tool and/or die set for such larger sizes thereby increasing the required inventory of dies and/or crimping tools to securely crimp larger diameter lugs and conductors.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A die set to crimp a connector onto a conductor, the die set comprising:

a first die and a second die adapted to be removably coupled to a crimping tool in a crimping configuration;

the first die having a first working surface that faces toward the second die in the crimping configuration and the second die having a second working surface that faces toward the first die in the crimping configuration, to crimp the connector onto the conductor when the conductor and connector are positioned between the first die and the second die in the crimping configuration;

the second working surface including planar surfaces and being configured to receive the connector and the conductor in the crimping configuration with the connector and the conductor positioned between the planar surfaces; and the first die further having an indenting member that projects from the first working surface of the first die to form an indentation in the connector to crimp the connector to the conductor, the indenting member having a plurality of non-planar faces that each include a concave portion.

2. The die set of claim 1, wherein the plurality of non-planar faces each further include a convex portion, the concave portion transitioning onto the convex portion.

3. The die set of claim 2, wherein the concave portions transition onto rims of the first die that project toward the second die in the crimping configuration.

4. The die set of claim 2, wherein the concave portions and the convex portions define at least part of a profile of the indentation in the connector, including convex portions of the profile that corresponds to the concave portions of the indenting member.

5. The die set of claim 1, wherein the working surface of the first die defines an apex; and wherein the concave portions of the plurality of non-planar faces are adjacent to the apex.

6. The die set of claim 5, wherein the apex surface is square.

7. The die set of claim 5, wherein the non-planar faces extend from the apex to define edges between adjacent sets of the non-planar faces; and wherein the concave portions extend to the edges of the corresponding non-planar faces.

8. The die set of claim 5, wherein the apex surface is rectangular.

9. The die set of claim 1, wherein the indenting member is bilaterally symmetric about one or more of a first axis of symmetry or a second axis of symmetry that is perpendicular to the first axis of symmetry.

10. The die set of claim 9, wherein the indenting member is bilaterally symmetric about each of the first axis of symmetry and the second axis of symmetry.

11. A die set for use in a crimping tool to crimp a connector onto a conductor, the die set comprising a first die that includes:

a mating surface to selectively mate with the crimping tool; and a working surface including an indenting member that projects away from the mating surface to form an indentation in the connector when the connector is crimped to the conductor by the crimping tool;

the indenting member having an apex and a plurality of non-planar faces that extend from the apex on opposing sides of the apex, each of the plurality of non-planar faces of the indenting member including a concave portion and a convex portion that transitions from the concave portion and are configured to form the indentation to have a plurality of non-planar faces, including a plurality of convex portions and a plurality of concave portions.

12. The die set of claim 11, wherein the apex is a square.

13. The die set of claim 11, wherein the apex is a rectangular portion.

14. The die set of claim 11, wherein the concave portions of the plurality of non-planar faces of the indenting member are adjacent to the apex.

15. The die set of claim 11, wherein the apex is at a distal end of the working surface, relative to the mating surface, and the convex portions extend at a proximal end of the working surface, relative to the mating surface.

16. The die set of claim 11, further comprising:

a second die that aligns with the first die to crimp the connector onto the conductor, the second die having a concave working surface to support the connector opposite the indenting member of the first die, including the concave portions of the plurality of non-planar faces of the indenting member.

17. The die set of claim 11, further comprising:

a second die that includes a second working surfaces with planar surfaces, the second die being configured to align with the first die to crimp the connector onto the conductor, with the connector and the conductor positioned between the planar surfaces.

18. A method of forming a crimped connection between a connector and a conductor using a crimping tool, the method comprising:

aligning the connector and the conductor between a first die and a second die; and moving the first die and the second die together so that:

a first working surface of a first die of the crimping tool, including an indenting member, and a second working surface of a second die of the crimping tool confront the connector; and the connector is deformed by the first and second working surfaces into a crimped configuration to form the crimped connection, the crimped configuration including an indentation on the connector that includes a plurality of non-planar faces, including a plurality of concave portions and a plurality of convex portions, the plurality of convex portions including a convex contour formed by a corresponding concave contour on the indenting member of the first working surface.

19. The method of claim 18, wherein deforming the connector includes forming the indentation to include convex contours on opposing sides of the indentation.

20. The method of claim 19, wherein aligning the connector and the conductor includes positioning the connector and the conductor between planar surfaces of the second working surface.

* * * * *